(12) United States Patent
Clade et al.

(10) Patent No.: US 8,604,149 B2
(45) Date of Patent: Dec. 10, 2013

(54) POLYSILANE-POLYCARBOSILANE COPOLYMER SOLUTIONS AND OXYGEN-DEPLETED CERAMIC MOULDED BODIES PREPARED THEREFROM WITH COMPOSITIONS SIMILAR TO THAT OF SIC

(75) Inventors: Juergen Clade, Wuerzburg (DE); Erich Seider, Rimpar (DE); Dieter Sporn, Wuerzburg (DE); Erika Brendler, Freiberg (DE); Thomas Lange, Chemnitz (DE); Gerhard Roewer, Freiberg (DE); Dorit Mainhold, Dresden (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 940 days.

(21) Appl. No.: 11/579,278

(22) PCT Filed: May 2, 2005

(86) PCT No.: PCT/EP2005/004754
§ 371 (c)(1),
(2), (4) Date: Dec. 26, 2007

(87) PCT Pub. No.: WO2005/108470
PCT Pub. Date: Nov. 17, 2005

(65) Prior Publication Data
US 2008/0207430 A1     Aug. 28, 2008

(30) Foreign Application Priority Data

May 3, 2004  (DE) .......................... 10 2004 021 666
Sep. 2, 2004  (DE) .......................... 10 2004 042 531

(51) Int. Cl.
| C04B 35/80 | (2006.01) |
| C08L 83/16 | (2006.01) |
| B28B 1/00 | (2006.01) |
| C08G 77/60 | (2006.01) |
| D01F 9/10 | (2006.01) |
| C04B 35/622 | (2006.01) |

(52) U.S. Cl.
CPC C08G 77/60 (2013.01); D01F 9/10 (2013.01); C08L 83/16 (2013.01); C04B 35/80 (2013.01); C04B 35/62281 (2013.01); C04B 2235/483 (2013.01); C04B 2235/723 (2013.01)
USPC .................. 528/12; 528/21; 501/88; 501/92; 501/95.2; 264/625

(58) Field of Classification Search
USPC ........... 501/88, 92, 95.2; 264/625; 528/12, 21
See application file for complete search history.

(56) References Cited

U.S. PATENT DOCUMENTS

| 4,414,403 | A |   | 11/1983 | Schilling et al. |
| 4,942,091 | A | * | 7/1990  | Umezawa et al. ............ 428/398 |
| 5,082,872 | A | * | 1/1992  | Burns et al. ..................... 522/77 |
| 5,270,429 | A | * | 12/1993 | Michalczyk .................... 528/42 |
| 5,416,232 | A | * | 5/1995  | Brendler et al. .............. 556/469 |
| 5,616,308 | A |   | 4/1997  | Richter et al. |
| 5,792,416 | A | * | 8/1998  | Sacks et al. .................. 264/625 |
| 8,466,076 | B2| * | 6/2013  | Ruedinger et al. ........... 501/95.2 |

FOREIGN PATENT DOCUMENTS

| DE | 3743373 A1 | 12/1987 |
| DE | 3743423 A1 | 12/1987 |
| DE | 4207299 A1 | 3/1992 |
| DE | 4304256 A1 | 2/1993 |
| DE | 3743373 A1 | 12/1993 |
| DE | 4405603 A1 | 2/1994 |
| EP | 0610809 A1 | 2/1994 |
| EP | 0688254 B1 | 2/1995 |
| GB | 2234753 A | 2/1991 |
| GB | 258465 A | 2/1993 |
| KR | 9506726 B1 | 6/1995 |

OTHER PUBLICATIONS

Babonneau et al., Chem. Mater., 1996, 8, 1415.*
S. Yajima et al., Chem. Lett. 931:1209 (1975).
S. Yajima et al., Chem. Lett. 435 (1976).
S. Yajima et al., Chem. Lett. 551 (1976).
S. Yajima et al. J. Mater. Sci. 13 (1978) 2569.
S. Yajima et al. J. Mater. Sci. 15 (1980) 720.
J.H. Sharp et al., J. Mater. Res. 10 (1995) 2659.
B. Boury et al., Agnew. Chem. 102 (1990) 818.
B. Boury et al., Chem. Mater. 3 (1991) 487.
B. Boury et al., Organometallics 10 (1991) 1457.
H.-J. Wu et al., Chem Mater. 1 (1989) 564.
M. Takeda et al., Ceram. Engng. Sci. Proc. 12 [7-8] (1991) 1007.
M. Takeda et al., Ceram. Engng. Sci. Proc. 13 [7-8] (1992) 209.
G. Chollon et al., J. Mater. Sci. 32 (1997) 893.

(Continued)

Primary Examiner — David M Brunsman
(74) Attorney, Agent, or Firm — Duane Morris LLP

(57) ABSTRACT

The invention relates to a method for producing a polysilane-polycarbosilane copolymer solution. Said method comprises the preparation of a polysilane, obtained by the disproportionation of a methylchlorodisilane or a mixture of methylchlorodisilanes of formula $Si_2Me_nCl_{6-n}$ with a Lewis base as the catalyst, a subsequent thermal cross-linking of the polysilane to form an infusible polysilane-polycarbosilane copolymer that is soluble in inert solvents, in addition to the production of said solution by the dissolution of the polysilane-polycarbosilane copolymer in an inert solvent. The invention also relates to a method for producing oxygen-depleted ceramic fibers and other molded bodies with a composition similar to that of SiC. Said method comprises the spinning of the solution to obtain green fibers according to the dry spinning method and the pyrolysis of the dried green fibers in an inert gas atmosphere or a reductive atmosphere.

15 Claims, No Drawings

(56) References Cited

OTHER PUBLICATIONS

K. Okamura et al., J. Mater. Sci. Lett. 4 (1985) 55.
W. Toreki et al., Ceram. Engng. Sci. Proc. 11 (1992) 198.
W. Toreki et al., Am. Chem. Soc. Polym. Prepr. 32 (1991) 584.
W. Toreki et al., Mater. Lett. 11 (1991) 19.
R.H. Baney et al., Organometallics 2 (1983) 859.
J. Lipowitz et al., Ceram. Engng. Sci. Proc. 9 [7-8] (1988) 931.
R. Richter et al., Appl. Organomet. Chem. 11 (1997) 71.
U. Herzog et al., Organomet. Chem. 507 (1996) 221.
F. Fourne, "Synthetische Fasern" [Synthetic Fibers], Carl Hauser Verlag 183 (1995).
V.B. Gupta, V.K. Kothari (eds.), Manufactured Fiber Technology, Chapman & Hall 126 (1997).
H. Ichikawa, J. Mater Sci. 21 (1986) 12, 4352-4358.
F. Duboudin, J. Organomet. Chem. 341 (1988) 1-3, 125-132.
Applied Organomet. Chem. (1997), 11(2), 71-106.
E. Henggee, Montash. Chem., Bd. 121 (1990) 10, 793-802.
A.A. Morrone et al., "TEM Microstructural Analysis of Ceramic Powders Derived from the Pyrolysis of Polyvinylmethylsilazane", Materials Letters, Apr. 1991, pp. 19-25, vol. 11, No. 1.2, Elsevier Science Publishers B.V. (North-Holland).
Toshio Shimoo et al., "Mechanism of Conversion from Oxidation-Cured Polycarbosilane to SiC Ceramic Fibers", Journal of the Ceramic Society of Japan, Int. Edition, 1994, pp. 950-956, vol. 102.

\* cited by examiner

POLYSILANE-POLYCARBOSILANE COPOLYMER SOLUTIONS AND OXYGEN-DEPLETED CERAMIC MOULDED BODIES PREPARED THEREFROM WITH COMPOSITIONS SIMILAR TO THAT OF SIC

This application is a 371 of PCT/EP2005/004754, filed May 2, 2005.

BACKGROUND

The present invention pertains to polysilane-polycarbosilane copolymer solutions, which were prepared by specific heat treatment from methylchloropolysilanes and were made not easily fusible or infusible in inert organic solvents. The present invention also pertains to oxygen-depleted ceramic molded bodies, especially fibers, which can be obtained from these solutions and have a composition similar to that of SiC, as well as oxygen-depleted ceramic matrices with a composition similar to that of SiC, which can be obtained from these solutions.

Silicon carbide materials are known for their mechanical strengths at high temperatures as well as their good resistance to oxidation. They are therefore considered for use for many applications, above all in the form of fibers as reinforcing elements in components, which are exposed to high temperatures and/or corrosive media.

Polysilanes were prepared for the first time by Kipping via Wurtz coupling of diphenyldichlorosilane with sodium. Burkhard synthesized and characterized dodecamethylcyclohexasilane for the first time in 1949. The latter was used by Yajima et al. as a starting material for preparing SiC ceramic fibers (S. Yajima et al., Chem. Lett., 1975, 931, 1209; 1976, 435). The compound may be crosslinked for this purpose in an autoclave by applying elevated temperature and overpressure, while conversion into polycarbosilane takes place (Kumada rearrangement). After the extraction of low-molecular-weight components, an infusible, high-molecular-weight polycarbosilane powder is obtained. Solutions of this powder in benzene or xylene can also be processed into green fibers according to the dry spinning process, which can be pyrolyzed into SiC ceramic fibers without prior curing. The essential drawback of this method is the complicated synthesis of the starting polymer, which includes the use of alkali metals, reactions in an autoclave and an elaborate extraction process.

In a variant of this method (S. Yajima et al., Chem. Lett., 1976, 551; J. Mater. Sci., 13 (1978), 2569, 15 (1980), 720), the application of high pressures during crosslinking and conversion into polycarbosilane is abandoned, which leads to a fusible material. This can be processed according to the melt spinning method into green fibers, which must then, however, be cured by aging in air at elevated temperature prior to the pyrolysis. The resulting ceramic fibers therefore contain several wt. % of oxygen, which considerably compromises their high-temperature stability (see below). Both method variants were patented, see U.S. Pat. No. 4,100,233.

West et al. describe the synthesis of a phenylmethylpolysilane by Wurtz coupling of a mixture of phenylmethyldichlorosilane and dimethyldichlorosilane (U.S. Pat. No. 4,260,780). Sharp et al., Mater. Res., 10 (1995), 2659, describe the synthesis of branched polysilanes by Wurtz coupling of $R_2SiCl_2/RSiC_3$ mixtures (R=methyl, ethyl or phenyl). The spinning method (melt spinning method) of the polymers obtained was investigated.

Numerous other methods for the synthesis of polycarbosilanes were proposed, e.g., the radical type crosslinking of monosilanes at high temperatures, which goes back, in principle, to the studies of Fritz from the 1950s (see DE 22 36 078), the coupling of vinyl silanes with chlorosilanes with the use of alkali metals (U.S. Pat. No. 4,414,403), the hydrosilylation of vinyl silanes with the use of Pt catalysts (B. Boury et al., Angew. Chem., 102 (1990), 818; Chem. Mater., 3 (1991), 487; Organometallics, 10 (1991), 1457), as well as the ring opening polymerization of 1,3-disilacyclobutane derivatives with complexes of the Pt metals as the catalyst (U.S. Pat. No. 4,631,179; H.-J. Wu et al., Chem. Mater., 1 (1989), 564; 25 (1992), 1840). Most of these synthesis routes have not found any industrial application to the best of the inventors' knowledge.

Curing is necessary, as a rule, for stabilizing the shape of the green fibers obtained from the polycarbosilanes by melt spinning in order to make the material infusible before the pyrolysis. This curing is carried out, as a rule, by treatment with a reactive gas. The curing with air at elevated temperature, which was practiced originally, has the drawback that increased quantities of oxygen are introduced into the fibers, which greatly compromises the high-temperature stability of the fibers (damage to the fibers due to the release of gaseous CO and/or SiO at high temperatures (T. Shimoo et al., J. Ceram. Soc. Jap., Int. Ed., 102 (1994), 952). Numerous attempts have therefore been made to reduce the introduction of oxygen during the curing of the green fibers.

Lipowitz (U.S. Pat. No. 5,051,215) describes the curing of green fibers with $NO_2$ instead of with air; the oxygen uptake is reduced now from approx. 10-15 wt. % (curing in air) to <7 wt. %. However, a minimum oxygen content of 5-6 wt. % is necessary to avoid sticking together in the fiber bundle.

As an alternative to the treatment with reactive gases, curing by irradiation with high-energy electrons (M. Takeda et al., Ceram. Engng. Sci. Proc., 12 [7-8] (1991), 1007; 13 [7-8] (1992), 209; G. Chollon et al., J. Mater. Sci., 32 (1997), 893) or gamma radiation (K. Okamura et al., J. Mater. Sci. Lett., 4 (1985), 55), in which the polymer is obviously subject to radical type subsequent crosslinking, is considered as well. However, the data published suggest in case of the latter method that curing is also brought about by the introduction of oxygen. Furthermore, the curing of the green fibers by irradiation is very cost-intensive.

Baney et al. (EP 251 678 A2) describe a method for preparing oxygen-depleted SiC fibers without prior curing of the green fibers by imparting intrinsic reactivity to a polycarbosilane by adding an unsaturated compound (e.g., a polyolefin) as well as a hydrosilylation catalyst (a Pt or Rh compound. This method requires that the starting polymer contains Si—H functional groups.

Toreki et al. proposed that fusible polycarbosilanes be subsequently made infusible by subsequent heat treatment in order to enable them to be processed according to the dry spinning method (W. Toreki et al., Ceram. Engng. Sci. Proc., 11 (1992), 198; Am. Chem. Soc., Polym. Prepr., 32 (1991), 584; Mater. Lett., 11 (1991), 19). However, they again used a starting material that can be obtained with difficulty only: The polydimethylsilanes purchased at that time from Hüls must be prepared from dimethyldichlorosilane and an alkali metal, a method that is rather complicated in terms of both process technology and safety engineering. The heat aftertreatment must be controlled, as was described, very accurately in order to obtain polycarbosilanes (PCs) in the desired high molecular weight range, because even though PCs with low molecular weight are soluble, they cannot be processed into ceramic fibers without a subsequent curing step, whereas PCs with a high molecular weight lack the desired solubility properties. The polycarbosilane mixtures obtained must consequently pass through a plurality of dissolution, filtration and concentration steps in order to obtain solutions with the desired rheological properties.

The disproportionation of disilanes with Lewis bases into monosilanes and polysilanes was discovered by Wilkins in 1953. The corresponding reaction with methylchlorodisilane mixtures from the Müller-Rochow synthesis was described by Bluestein as well as by Cooper and Gilbert. A closer investigation of the polysilane residue formed during the disproportionation was performed by Baney, see *Organometallics,* 2 (1983), 859. Besides several other derivatizations, Baney also described the preparation of extensively Cl-free methylpolysilane and methylhydridopolysilane by reacting this residue with Grignard compounds or $LiAlH_4$ (U.S. Pat. No. 4,298,559; U.S. Pat. No. 4,310,482). However, green fibers that were prepared from such a polysilane permethylated by Grignard reaction must be cured (J. Lipowitz et al., *Ceram. Engng. Sci. Proc.,* 9 [7-8] (1988), 931); however, more specific data are not mentioned about this.

Roewer et al. investigated the disproportionation of the methylchlorodisilanes $Cl_2MeSiSiMeCl_2$, $Cl_2MeSiSiMe_2Cl$ and $ClMe_2SiSiMe_2Cl$ during both homogeneous catalysis and heterogeneous catalysis. Nitrogen-containing heterocycles, above all N-methylimidazole, were used in the first case, and nitrogen-containing heterocycles or bis(dimethylamino)-phosphoryl groups, which were bound to the surface of a silicate carrier, were used in the second case. Several oligosilanes were able to be identified in the product mixture. Even though heat aftertreatment of the polysilanes for converting them into polycarbosilanes was also disclosed according to EP 0 610 809 A1, this glass-like product can be melted again at least on relatively mild heat treatment (up to 220° C.).

The preparation of silicon carbide fibers from the polysilanes thus obtained was also described, e.g., in EP 668 254 B1. However, since the polysilanes are fusible, the green fibers must be cured at elevated temperature before the pyrolysis.

It was shown based on a material that was obtained by heterogeneously catalyzed (bis-dimethylaminophosphoryl groups on silicate carrier) disproportionation of pure 1,1,2,2-tetrachlorodimethyldisilane that methylchloropolysilanes are partially also rearranged into polycarbosilanes in a temperature range between 350° C. and 450° C. (R. Richter et al., *Appl. Organomet. Chem.,* 11 (1997), 71). At the same time, extensive crosslinking is observed, while Cl-containing terminal groups are split off.

The object of the present invention is to provide a method for preparing a polysilane-polycarbosilane copolymer solution, from which ceramic molded bodies with a composition similar to that of SiC can be produced. The starting material for this solution shall be available from inexpensive educts in a simple manner and able to be converted in a very simple manner into a material that is suitable for dry spinning and can be converted into the corresponding ceramic material after shaping without any further treatment.

It was found that the polysilanes that can be obtained by the disproportionation of methylchlorodisilane mixtures as they are generated during the direct synthesis of methylchlorosilanes (Müller-Rochow process (U.S. Pat. No. 2,380,995 (1941); R. Müller, *Wiss. Z. Techn. Univ. Dresden,* 12 (1963), 1633) with Lewis base catalysts can be easily modified by a subsequent, specific heat treatment such that even though they are not easily fusible or infusible, they are still sufficiently soluble in inert solvents in order to be able to be subjected to further processing in a molding process. Solutions of these materials, which will hereinafter be called "polysilane-polycarbosilane copolymers," can be used to prepare fibers according to the dry spinning method or to build up ceramic matrices according to the liquid-phase infiltration method.

Polymer fibers that can be obtained from these solutions can be pyrolyzed into oxygen-depleted SiC ceramic fibers without sticking together without further shape-stabilizing treatment in the bundle.

Mixtures of methylchlorodisilanes of the composition $Si_2Me_nCl_{6-n}$ (n=1-4), preferably those that are obtained as a high-boiling fraction (bp. 150-155° C.) during the "direct synthesis" according to Rochow and Müller, are used as the starting material for producing the polymer. These mixtures consist, as a rule, of a mixture of 1,1,2,2-tetrachloro-dimethyldisilane and 1,1,2-trichlorotrimethyldisilane with less than 10 mol. % of other components. The two disilanes mentioned are preferably charged in advance at a molar ratio ranging from 0.5:1 to 1.5:1.

The preparation according to the present invention of the raw polysilane takes place according to, e.g., EP 610 809 or U. Herzog et al., *Organomet. Chem.,* 507 (1996), 221, by disproportionation of the disilane mixtures during homogeneous catalysis with a Lewis base preferably at elevated temperature, the monosilane mixtures formed as breakdown products during the reaction being distilled off continuously. The reaction temperature is preferably 150-300° C. and more preferably 200-250° C. An organic nitrogen compound with Lewis basicity is used as the catalyst. Preferred catalysts are nitrogen-containing heterocycles such as pyridine, quinoline, N-methylpiperidine, N-methylpyrrolidine, N-methylindole or N-methylimidazole. The quantity of catalyst used is preferably 1 wt. % to 2 wt. %. The disproportionation otherwise takes place under the conditions known from the literature; in particular, it is favorable to keep moisture and oxygen away from the materials by the use of inert gas such as ultrapure nitrogen gas.

The addition of a crosslinking aid proved to be especially advantageous for the preparation according to the present invention of the raw polysilane. This crosslinking aid may be an aryl halosilane, an aryl haloborane or a mixture of these compounds. Phenyltrichlorosilane, diphenyldichlorosilane and phenyldichloroborane are preferably used as crosslinking aids, phenyltrichlorosilane being especially preferred. The quantity of crosslinking aid used is preferably 5 wt. % to 20 wt. % and more preferably 10 wt. % to 15 wt. %.

The raw polysilane is subjected according to the present invention to a further heat treatment, during which it is made not easily fusible or infusible, on the one hand, by increasing the mean molecular weight and, on the other hand, it is converted into a polysilane-polycarbosilane copolymer by the rearrangement reactions now taking place. Another effect of this heat aftertreatment that is intended according to the present invention is the reduction of the chemically bound chlorine content.

The heat aftertreatment takes place, as a rule, under atmospheric pressure, and it is highly advisable to work in the absence of moisture and oxygen. The material is therefore advantageously treated under inert gas, especially advantageously under an ultrapure nitrogen atmosphere, the temperatures being allowed to rise in the process to values between 250° C. (or close to 300° C.) and 500° C., preferably to between 380° C. and 450° C. and especially preferably to between 390° C. and 420° C. The heating up is preferably carried out continuously, for example, at a rate of 1-5° K per minute, preferably 2-4° K per minute. Low-molecular-weight methylchlorosilanes generated as breakdown products during the reaction are distilled off continuously. The end point of the heat aftertreatment becomes noticeable from a steep rise of the torque of the stirrer. Last residues of volatile components are removed under vacuum in a temperature range about 100° C. during the subsequent cooling phase. The infusible, but soluble copolymer needed for preparing the polysilane-polycarbosilane solution according to the present invention can thus be prepared in a single step, and further separating steps (extractions, filtrations) are usually no longer necessary. It is also favorable that the subsequent crosslinking can directly follow the disproportionation.

To prepare the polymer solutions according to the present invention, the polysilane-polycarbosilane copolymer is dissolved in an inert organic solvent. The dissolution operation may be carried out at room temperature or while heating. Mainly apolar solvents, such as aliphatic hydrocarbons (e.g., n-pentane, n-hexane, cyclohexane, n-heptane, n-octane), aromatic hydrocarbons (e.g., benzene, toluene, o-xylene, sym.-mesitylene), halogenated hydrocarbons (e.g., methylene chloride, chloroform, carbon tetrachloride, 1,1,1-trichloroethane, chlorobenzene) or ethers (e.g., diethyl ether, diisopropyl ether, tetrahydrofuran, 1,4-dioxane or a higher or non-symmetric ether) may be considered for use as the solvent. The solvent is preferably a halogenated or halogen-free hydrocarbon, especially preferably a halogen-free aromatic hydrocarbon from the group comprising benzene, toluene and o-xylene.

The percentage of the polysilane-polycarbosilane copolymer in the polymer solution may be set depending on the intended use of the solution. If the solution is used to prepare fibers according to the dry spinning method, it is advantageous to use polymer in a quantity of 50-90 wt. % and preferably 60-70 wt. %. If the solution is used to prepare ceramic matrices according to the liquid-phase infiltration method, the percentage of polymer may be selected to be markedly lower, e.g., 20 wt. %, because of the necessary low viscosity.

To use, according to the present invention, the polymer solution for preparing fibers according to the dry spinning method, it is often necessary, but at least usually helpful to add a spinning aid to set the necessary viscoelastic properties. Organic polymers soluble in the particular solvent, for example, polyethylene, polypropylene, polystyrene, polyvinyl chloride, polyacrylonitrile or poly(4-vinylpyridine) may be considered for use as spinning aids. The preferred spinning aid is polystyrene; the quantity is preferably between 1 wt. % and 5 wt. % and especially preferably 2 wt. %.

The preparation of SiC ceramic fibers from the polymer solutions according to the present invention will be described below, but this description shall not be construed as a restriction of the possibilities of application of this solution.

Polymer fibers are prepared according to the dry spinning method; this belongs to the state of the art (F. Fourné, "Synthetische Fasern" [Synthetic Fibers], Carl Hauser Verlag 1995, p. 183; V. B. Gupta, V. K. Kothari (eds.), "Manufactured Fiber Technology," Chapman & Hall 1997, p. 126). Preferred parameters for the spinning process are the use of a nozzle packet with nozzles of a diameter of 75 µm to 300 µm and a capillary length of 0.2 mm to 0.5 mm, a cabinet temperature of 20° C. to 50° C. at a length of 2 m and a pull-off speed of 100 m/minute to 300 m/minute.

The polymer fibers according to the present invention can be pyrolyzed without prior shape-stabilizing treatment. The preferred parameters for the pyrolysis are a heat-up rate between 5 K/minute and 50 K/minute and a final temperature of 900° C. to 1,200° C. The pyrolysis may be carried out under inert ($N_2$, Argon) or reducing (Argon/$H_2$, $N_2$/CO, etc.) atmosphere. The preferred atmosphere for the pyrolysis is nitrogen or forming gas (Argon with 10 vol. % of $H_2$). For example, an electric oven is suitable for use as the oven.

After pyrolysis, the ceramic fibers may be subjected to a further heat treatment, which leads to their compaction and partial crystallization and improves their mechanical strengths.

The following examples are used to describe and illustrate the present invention in more detail, but they shall not be construed as restricting the field of application.

EXAMPLE 1

Preparation of a Polysilane

Six hundred g of a methylchlorodisilane mixture ("disilane fraction" from the Müller-Rochow process, consisting of 50 mol. % of $Cl_2MeSiSiMeCl_2$ and 50 mol. % of $Cl_2MeSiSiMe_2Cl$; bp. 150-155° C.) are mixed with 14 g of N-methylimidazole and 69 g of phenyltrichlorosilane and heated to 220° C. at a rate of 0.5° K per minute. Four hundred fifty mL of a distillate, which consists of 56 mol. % of Me-$SiCl_3$, 41 mol. % of $Me_2SiCl_2$, 1 mol. % of $Me_3SiCl$ as well as 2 mol. % of higher methylchlorosilanes, as well as 153 g of a dark brown polysilane, which is solid at room temperature and is sensitive to hydrolysis, are obtained in the process.

EXAMPLE 2

Preparation of a Polysilane-Polycarbosilane Copolymer

One hundred fifty-one g of a polysilane according to Example 1 are heated in a round-bottom flask to 400° C. at a rate of 3° K per minute and maintained at this temperature for 50 minutes. The temperature is maintained at 100° C. for 1 hour during the subsequent cooling and the last residues of volatile components are drawn off during this time by applying vacuum. Sixteen mL of a yellow distillate, which consists of various mono-, di- and oligo-methylchlorosilanes, as well as 108.5 g of a dark brown polysilane-polycarbosilane copolymer are obtained.

EXAMPLE 3

Preparation of Polysilane-Polycarbosilane Copolymer Green Fibers

Thirty-five g of the copolymer according to Example 2 are dissolved in 40 mL of toluene while heating at 110° C. and mixed with a solution of 1 g of polystyrene in 11 mL of toluene. By drawing off toluene under vacuum, the viscosity of the solution is set at 2 Pa·s. The spinning mass thus obtained is filled under inert conditions (Glovebox) into a spinning apparatus, which comprises a steel cylinder with a nozzle plate on the underside and a fitted punch, which is vertically movable by means of an electric motor. By feeding the punch, the spinning mass is extruded through the nozzles (diameter 150 µm, 1=0.45 mm) in the form of a strand. After having fallen through a cabinet heated at 40° C., the polymer filaments are wound up on a godet wheel. The solvent evaporates in the spinning cabinet, and the distortion can be continuously varied by varying the speed of rotation of the godet wheel. Green fibers with a diameter of 30 µm are obtained at a pull-off speed of 175 m/minute.

EXAMPLE 4

Preparation of Sic Ceramic Fibers

The green fibers prepared according to Example 3 are pyrolyzed in an upright tubular furnace under an inert gas atmosphere ($N_2$) at a rate of 12° K per minute up to a final temperature of 1,200° C. Black, shiny fibers with an oxygen content of 0.6-0.8 wt. %, a diameter of 22-25 μm, a tensile strength of 500-600 MPa and a modulus of elasticity of 110-130 GPa are obtained. The fibers are still relatively thick and have fractures mostly with a kidney-shaped cross section.

These defects can be eliminated in the future by improved spinning parameters, which might lead to a considerable increase in the tensile strength of the fibers. It is possible to increase the modulus of elasticity by sintering the fibers at high temperatures.

The invention claimed is:

1. Method for preparing a polysilane-polycarbosilane copolymer solution, especially for preparing fibers or for building up ceramic matrices, comprising
   (1) the provision of a polysilane, obtained by the disproportionation of a methylchlorodisilane or of a mixture of a plurality of methylchlorodisilanes of a composition of $Si_2Me_nCl_6$, wherein n=1-4, with a Lewis base as a catalyst,
   (2) a subsequent thermal crosslinking of the polysilane according to (1) into an infusible polysilane-polycarbosilane copolymer soluble in inert solvents, and
   (3) the preparation of the solution by dissolving the polysilane-polycarbosilane copolymer in an inert solvent, wherein the polysilane is or was obtained by adding a crosslinking aid, selected from the group consisting of arylhalosilanes, arylhaloboranes and mixtures of these compounds.

2. Method in accordance with claim 1, comprising the preparation of the polysilane according to (1) by the disproportionation of a methylchlorodisilane or of a mixture of a plurality of methylchlorodisilanes of the composition $Si_2Me_nCl_{6-n}$ with a Lewis base as the catalyst.

3. Method in accordance with claim 1, characterized in that the solution is prepared by adding an organic polymer as a spinning aid.

4. Method in accordance with claim 2, characterized in that the methylchlorodisilane mixture consists of $Cl_2MeSiSiMeCl_2$ and $Cl_2MeSiSiMe_2Cl$ at a molar ratio of 0.5 to 1.5 with less than 10 mol. % of other components.

5. Method in accordance with claim 1, characterized in that at least one of the compounds from the group comprising N,N'-dimethylaniline, N,N'-dimethyltoluidine, pyridine, 2,2'-bipyridine, phenanthroline, quinoline, N-methylpiperidine, N-methylpyrrolidine, N-methylindole or N-methylimidazole is used as the catalyst.

6. Method in accordance with claim 1, characterized in that phenyltrichlorosilane and/or phenyldichloroborane is used as the crosslinking aid.

7. Method in accordance with claim 1, characterized in that the percentage of the crosslinking aid is between 5 wt. % and 20 wt. %, relative to the methylchlorodisilane or the mixture of a plurality of methylchlorodisilanes from which the polysilane was obtained.

8. Method in accordance with claim 1, characterized in that the subsequent thermal crosslinking is carried out at temperatures of 250° C. to 500° C.

9. Method in accordance with claim 1, characterized in that a saturated hydrocarbon selected from the group consisting of n-pentane, n-hexane, cyclohexane, n-heptane, n-octane, an aromatic hydrocarbon selected from the group consisting of benzene, toluene, o-xylene, sym.-mesitylene, a chlorinated hydrocarbon selected from the group consisting of methylene chloride, chloroform, carbon tetrachloride, 1,1,1-trichloroethane, chlorobenzene, or an ether selected from the group consisting of diethyl ether, diisopropyl ether, tetrahydrofuran, 1,4-dioxane or a mixture of two or more of these solvents is used as the solvent.

10. Method in accordance with claim 1, characterized in that an organic polymer from the group comprising polyethylene, polypropylene, polystyrene, polyvinyl chloride, polyacrylonitrile or poly(4-vinylpyridine) is used as a spinning aid.

11. Method in accordance with claim 1, characterized in that the quantity of the polysilane-polycarbosilane copolymer in the solution is between 30 wt. % and 95 wt. % and the quantity of the spinning aid is between 0 wt. % and 10 wt. %.

12. Method for preparing oxygen-depleted ceramic fibers with a composition similar to that of SiC, comprising the steps:
   (1) preparation of a polysilane-polycarbosilane copolymer solution in accordance with claim 1,
   (2) spinning of the solution into green fibers according to the dry spinning method, and
   (3) pyrolysis of the dried green fibers from step (2) under an inert gas atmosphere or reducing atmosphere.

13. Method in accordance with claim 12, characterized in that the dry spinning process is carried out at a temperature of 20° C. to 100° C. at a pull-off velocity of 20 m/minute to 500 m/minute.

14. Method in accordance with claim 12, characterized in that the pyrolysis of the green fibers is carried out at a final temperature of 900° C. to 1,200° C. at a heat-up rate of 1° K per minute to 50° K per minute under an inert ($N_2$, Ar) or reducing (Ar/$H_2$, $N_2$/CO) atmosphere.

15. Method in accordance with claim 12, characterized in that the ceramic fibers obtained are sintered at temperatures of 1,200-2,000° C. under an inert ($N_2$, Ar) or reducing (Ar/$H_2$, $N_2$/CO) atmosphere.

* * * * *

UNITED STATES PATENT AND TRADEMARK OFFICE
CERTIFICATE OF CORRECTION

PATENT NO. : 8,604,149 B2
APPLICATION NO. : 11/579278
DATED : December 10, 2013
INVENTOR(S) : Clade et al.

Page 1 of 1

It is certified that error appears in the above-identified patent and that said Letters Patent is hereby corrected as shown below:

Title Page

The Abstract:

The invention relates to a method for producing a polysilane-polycarbosilane copolymer solution. Said method comprises the preparation of a polysilane, obtained by the disproportionation of a methylchlorodisilane or a mixture of methylchlorodisilanes of formula "Si2Me$_n$Cl$_{6-n}$" with a Lewis base as the catalyst, a subsequent thermal cross-linking of the polysilane to form an infusible polysilane-polycarbosilane copolymer that is soluble in inert solvents, in addition to the production of said solution by the dissolution of the polysilane-polycarbosilane copolymer in an inert solvent. The invention also relates to a method for producing oxygen-depleted ceramic fibers and other molded bodies with a composition similar to that of SiC. Said method comprises the spinning of the solution to obtain green fibers according to the dry spinning method and the pyrolysis of the dried green fibers in an inert gas atmosphere or a reductive atmosphere.

should read:

--The invention relates to a method for producing a polysilane-polycarbosilane copolymer solution. Said method comprises the preparation of a polysilane, obtained by the disproportionation of a methylchlorodisilane or a mixture of methylchlorodisilanes of formula –Si$_2$Me$_n$Cl$_{6-n}$– with a Lewis base as the catalyst, a subsequent thermal cross-linking of the polysilane to form an infusible polysilane-polycarbosilane copolymer that is soluble in inert solvents, in addition to the production of said solution by the dissolution of the polysilane-polycarbosilane copolymer in an inert solvent. The invention also relates to a method for producing oxygen-depleted ceramic fibers and other molded bodies with a composition similar to that of SiC. Said method comprises the production of a polysilane-polycarbosilane copolymer solution,-- the spinning of the solution to obtain green fibers according to the dry spinning method and the pyrolysis of the dried green fibers in an inert gas atmosphere or a reductive atmosphere.--

Signed and Sealed this
Twenty-sixth Day of May, 2015

Michelle K. Lee
*Director of the United States Patent and Trademark Office*